United States Patent
Lee et al.

(10) Patent No.: US 7,516,136 B2
(45) Date of Patent: Apr. 7, 2009

(54) TRANSCODING MEDIA FILES IN A HOST COMPUTING DEVICE FOR USE IN A PORTABLE COMPUTING DEVICE

(75) Inventors: Edgar Y. Lee, Palo Alto, CA (US); Anthony Armenta, San Jose, CA (US); Matthew W. Crowley, Los Altos, CA (US)

(73) Assignee: Palm, Inc., Sunnyvale, CA (US)

( * ) Notice: Subject to any disclaimer, the term of this patent is extended or adjusted under 35 U.S.C. 154(b) by 424 days.

(21) Appl. No.: 11/131,777

(22) Filed: May 17, 2005

(65) Prior Publication Data

US 2006/0265384 A1 Nov. 23, 2006

(51) Int. Cl.
G06F 17/30 (2006.01)
G06F 15/167 (2006.01)
G06F 15/16 (2006.01)

(52) U.S. Cl. .................. 707/10; 707/4; 709/213; 709/217; 709/227; 709/238

(58) Field of Classification Search .................. 707/101, 707/4, 10; 709/212, 213, 238, 217, 227
See application file for complete search history.

(56) References Cited

U.S. PATENT DOCUMENTS 6,978,316 B2 * 12/2005 Ghaffar et al. .............. 709/246
2003/0031260 A1 * 2/2003 Tabatabai et al. ........ 375/240.25
2003/0220781 A1 * 11/2003 Salmonsen et al. ............ 703/25
2004/0054689 A1 * 3/2004 Salmonsen et al. ........ 707/104.1
2005/0060279 A1 * 3/2005 Xue ............................. 707/1
2006/0101116 A1 * 5/2006 Rittman et al. .............. 709/204

FOREIGN PATENT DOCUMENTS

| EP | 1220120 | * | 3/2002 |
| WO | WO/01/31497 | * | 3/2001 |
| WO | WO/02/03147 | * | 3/2001 |

* cited by examiner

Primary Examiner—Luke S. Wassum
Assistant Examiner—Alexandria Y Bromell
(74) Attorney, Agent, or Firm—Fenwick & West LLP

(57) ABSTRACT

Media data files stored in a first computing device are transcoded for transferring to a second, portable computing device. The device parameters of the second computing device are determined by determining the type of the second computing device, and selecting one from a plurality of sets of predetermined, pre-stored device parameters for different types of second computing devices, based on the type of the second computing device. A selected media data file is transcoded in accordance with the determined device parameters of the second computing device, regardless of whether the second computing device is connected to the first computing device. When the second computing device is connected to the first computing device, the transcoded media data file is transferred from the first computing device to the second computing device.

20 Claims, 6 Drawing Sheets

TRANSCODING MEDIA FILES IN A HOST COMPUTING DEVICE FOR USE IN A PORTABLE COMPUTING DEVICE

BACKGROUND OF THE INVENTION

1. Field of the Invention

The present invention relates to transcoding media data files, and more specifically, to transcoding media data files stored on a host computing device for use in a portable computing device.

2. Description of the Related Art

Conventional portable computing devices such as personal digital assistants (PDAs) or other types of handheld computing devices are designed to operate in conjunction with a host computing device such as a desktop computer or laptop computer. The portable computing device is sometimes used to carry documents originally stored on the host computing device so that the user can access the document using the portable computing device while he is away from the host computing device. For example, a user of the portable computing device may want to transfer a media file, such as a video file (e.g., MPEG file) or an audio file (e.g., mp3 file) stored on the host computing device to the portable computing device, so that user may watch the video or listen to music while the user is away from the host computing device.

An issue that arises when such media files are transferred from the host computing device to the portable computing device is that the device parameters of the portable computing device, such as the display size, depth of color, type of graphics engine, size of memory, audio characteristics, processor speed, and the like, may be different from the device parameters of the host computing device. Simply copying the media files from the host computing device to the portable computing device may not work, because the device parameters of the portable computing device may not be compatible with the characteristics of the original media file formatted for and stored in the host computing device.

Another issue arises when the portable computing device is disconnected from the host computing device in the middle of the transcoding process. Conventional data management software managing the transcoding process simply stops the transcoding process if the portable computing device is disconnected from the host computing device in the middle of the transcoding process. Thus, the conventional transcoding process has to be restarted all over again from the beginning if the portable computing device is reconnected to the host computing device.

Therefore, there is a need for transcoding media files to be compatible with the device parameters of the portable computing device when the media files are transferred from the host computing device to the portable computing device. There is also a need for a transcoding process that obviates restarting the transcoding process all over again from the beginning if the portable computing device is disconnected from the host computing device in the middle of the transcoding process and is then reconnected.

SUMMARY OF THE INVENTION

An embodiment of the present invention provides a method and system for transcoding a media data file, such as a video or audio file, stored in a first computing device for transferring to a second, portable computing device, in which the transcoding can be performed for a number of different types of second computing devices and the transcoding continues even if the second computing device is disconnected from the first computing device.

Data management software in the first computing device receives a selection of a media data file to be transcoded, and determines the device parameters of the second computing device communicatively coupled to the first computing device. The device parameters may include display characteristics of the second computing device, audio characteristics of the second computing device, the processing speed of a processor of the second computing device, the size of storage available in the second computing device, and the like.

The data management software transcodes the selected media data file in accordance with the determined device parameters of the second computing device, regardless of whether the second computing device is communicatively coupled to the first computing device. Therefore, even if the second computing device is disconnected from the first computing device in the middle of the transcoding process, the transcoding still continues. The transcoded media data file is temporarily stored in a data queue of the first computing device. When the second computing device becomes communicatively coupled to the first computing device, the transcoded media data file is transferred from the queue of the first computing device to the second computing device.

In one embodiment, the device parameters for a plurality of different types of second computing devices are predetermined and pre-stored in the first computing device. When the second computing device is communicatively coupled to the first computing device, the data management software determines the type of the second computing device and selects the set of predetermined device parameters corresponding to the determined type of the second computing device, for use in the transcoding process.

The transcoding method in accordance with the present invention has the advantage that the transcoding of media data files can be performed for different types of second computing devices, because the device parameters for each of the different types of second computing devices are predetermined and pre-stored. In addition, the second computing device can be disconnected in the middle of the transcoding process without interrupting the transcoding process. When the second computing device is reconnected to the first computing device, the transcoded media data file can then be transferred to the second computing device. Therefore, the user of the second computing device need not wait until the transcoding process is completed, which may take minutes or even hours, before disconnecting the second computing device from the first computing device.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

DETAILED DESCRIPTION OF EMBODIMENTS

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1A:
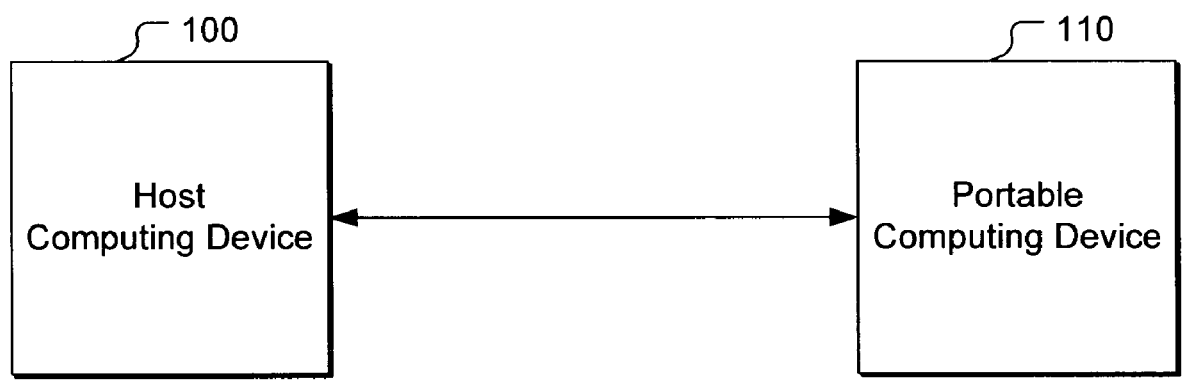
FIG. 1A illustrates an embodiment of a handheld computing device used with a host computing device, in accordance with the present invention.

FIG. 1A is a simplified diagram illustrating a portable computing device 110 used with a host computing device 100. The host computing device 100 may be a conventional personal computer such as a desktop computer or a laptop computer or any other type of computing device. The portable computing device 110 may be a personal digital assistant (PDA), a cellular telephone, a smart phone, a media player device, or even another personal computer such as a laptop computer.

The portable computing device 110 is capable of communicating with the host computing device 100 to exchange data between each other. For example, a user of the portable computing device 110 may transfer a media file, such as a video file (e.g., MPEG file) or an audio file (e.g., mp3 or wma file) stored on the host computing device 100 to the portable computing device 110, so that user may watch the video or listen to music while the user is away from the host computing device 100. In this regard, the host computing device 100 includes data management software for managing the transcoding (reformatting) and transfer of media files from the host computing device 100 to the portable computing device 110. The transcoding process may include changing the coding format of the media data files as well as modifying the media data file so that it becomes compatible with the video hardware, audio hardware, or other hardware of the second computing device. Transcoding occurs in response to a command by the users selecting a media data file for transcoding and transferring to the portable computing device 110.

Figure 1B:
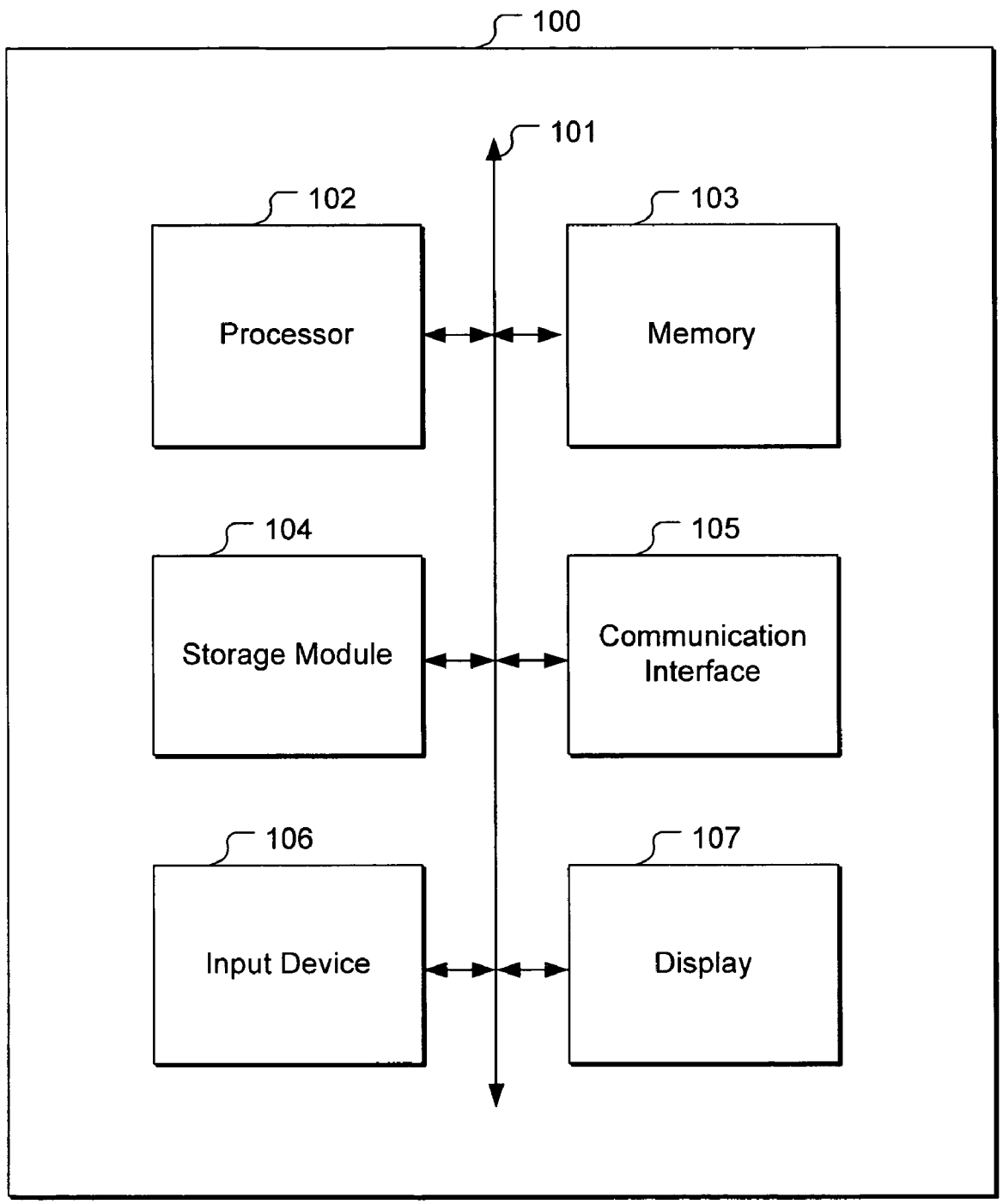
FIG. 1B is a block diagram illustrating an embodiment of a hardware architecture of the host computing device, in accordance with the present invention.

FIG. 1B is a block diagram illustrating the hardware architecture of the host computing device, according to one embodiment of the present invention. In one embodiment, the host computing device 100 is a general purpose personal computer including a processor 102, a memory 103, a storage module (e.g., hard disk drive) 104, an input device (keyboard, mouse, and the like) 106, a display 107, and a communication interface 105, all exchanging data with one another through a data bus 101. The communication interface 105 may include one or more interfaces used to communicate with the portable computing device 110 and exchange and synchronize data between each other. The communication interface 105 may be a USB (Universal Serial Bus) interface, a serial interface, a parallel interface, a Bluetooth interface, a WiFi (IEEE 802.11) interface, a cellular telephone interface, a wireless data networks, a G3 network, or any other type of wired or wireless communication interface. The storage module 104 stores the data management software that is run by the processor 102 in conjunction with the memory 103 to manage the transcoding and transferring of media data files from the host computing device 100 to the handheld computing device 110.

Figure 1C:
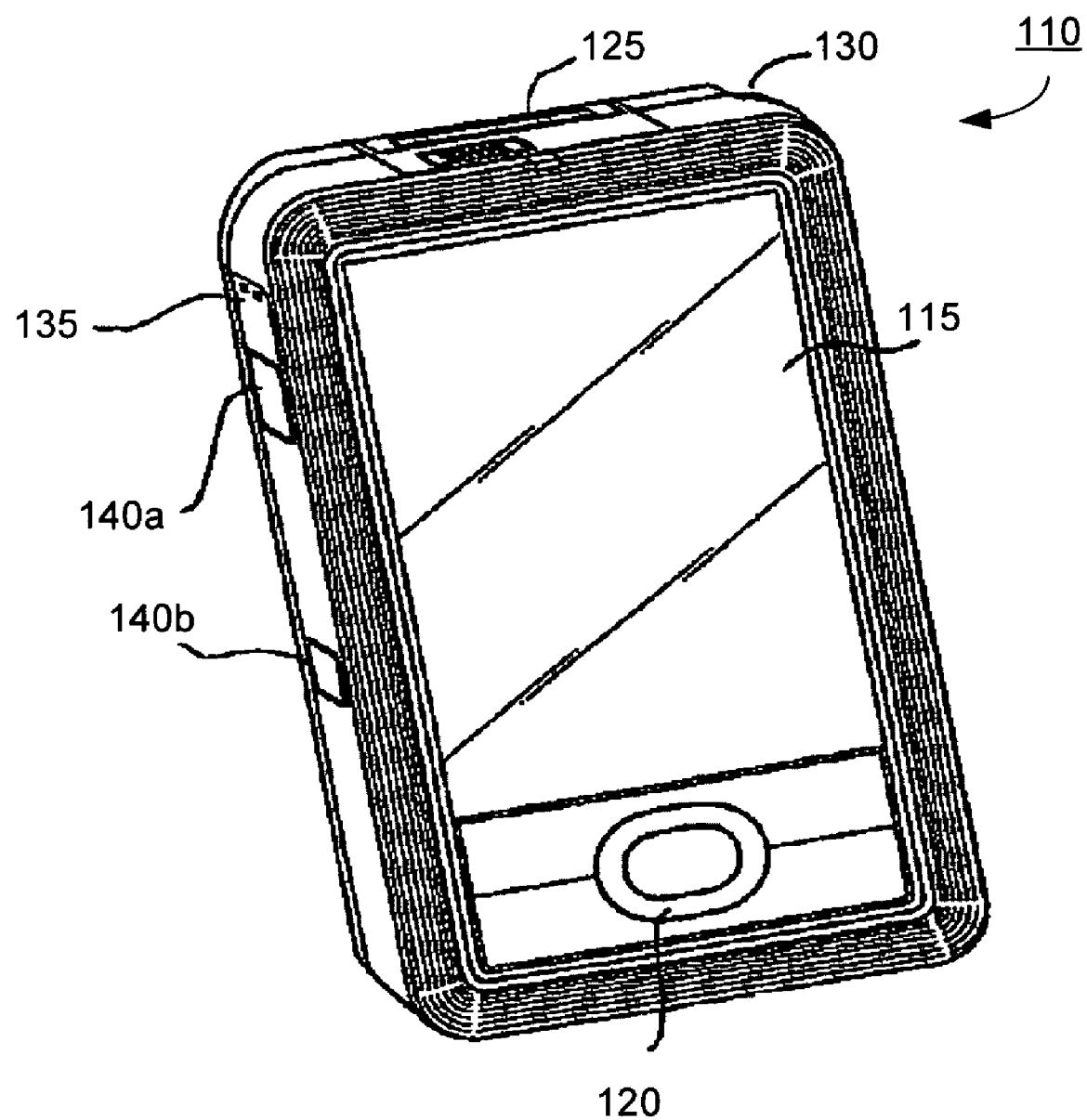
FIGS. 1C, 1D, and 1E illustrate one embodiment of a portable computing device in accordance with the present invention.
Figure 1D:
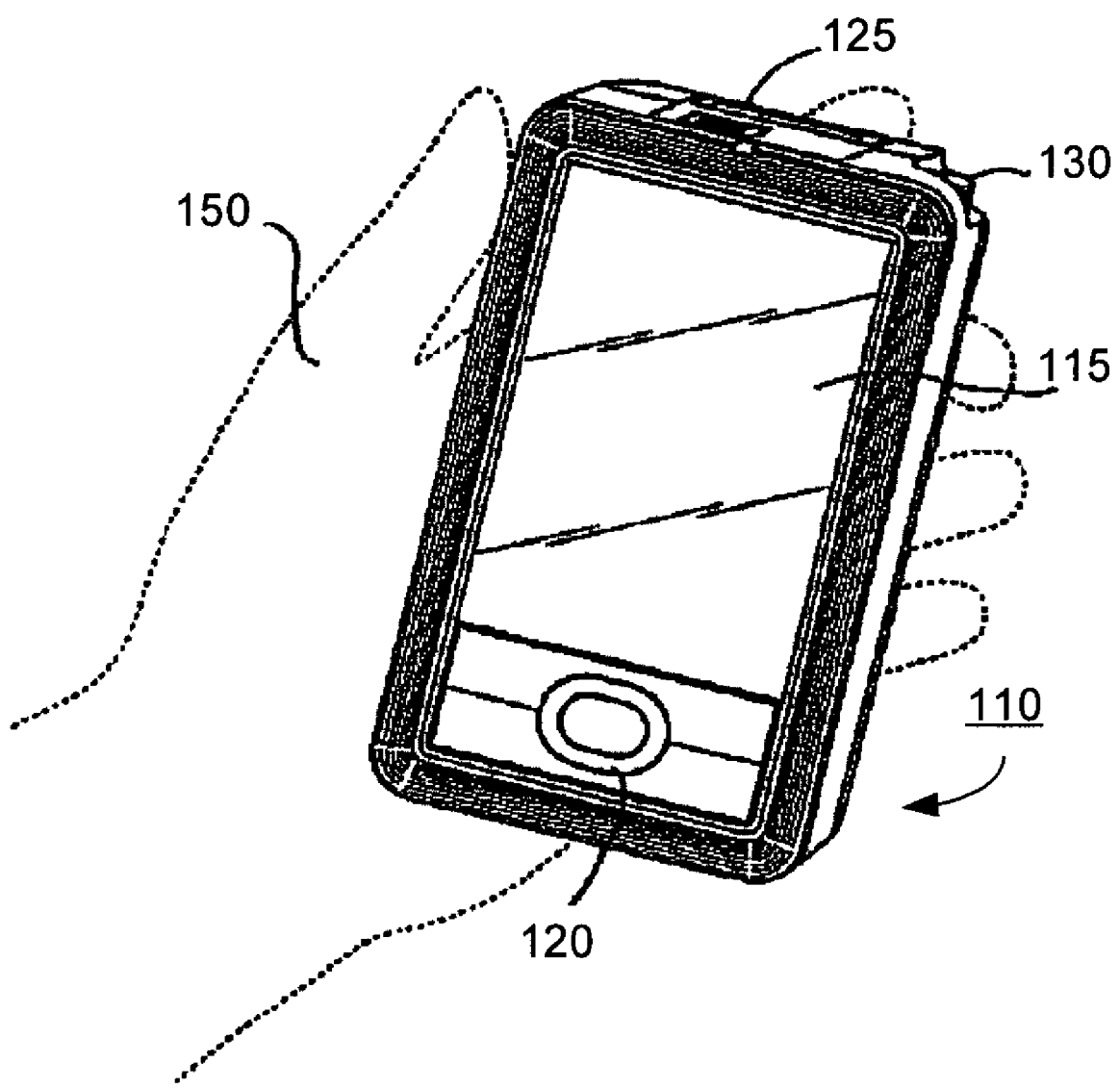
Figure 1E:
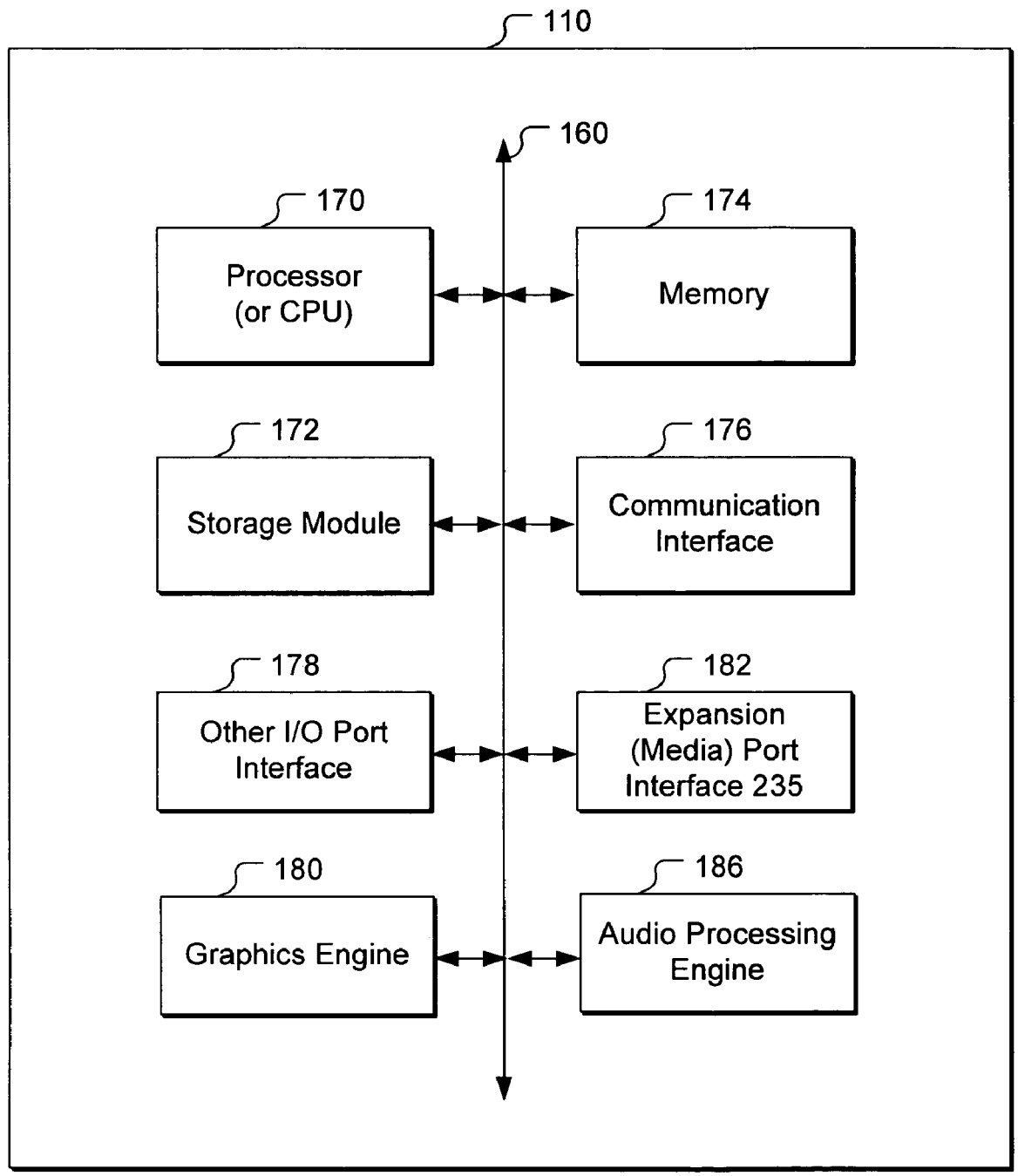

FIGS. 1C, 1D, and 1E illustrate one embodiment of a portable computing device in accordance with the present invention. As illustrated in FIG. 1D, the portable computing device 110 is configured to be of a form factor that is convenient to hold in a user's hand, for example, a personal digital assistant (PDA) or a smart phone form factor. For example, the portable computing device 110 can have dimensions that range from 3 to 6 inches by 2 to 5 inches by 0.25 to 0.85 inches, and weigh between 2 and 10 ounces.

Referring back to FIG. 1C, the portable computing device 110 includes a screen (or display) 115, a screen navigation interface 120, an expansion (or media) port (or slot) 125, a stylus 130, a microphone 135, and one or more control buttons, e.g., voice recorder button, screen rotation button, etc., 140a, b (generally 140). The screen is, for example, a 320× 480 transflective TFT color display that includes touch screen support. The expansion slot 125 is configured to receive and support various expansion (or media) cards that include memory such as CompactFlash™ cards, SD (Secure Digital) cards, xD cards, Memory Sticks™, MultiMediaCard™, SDIO cards, and the like. Further, the screen navigation interface 120, the stylus 130, the microphone 135, and the one or more control buttons 140 are conventional, although various functions can be applied to them.

Turning to FIG. 1E, illustrated is one embodiment of a computing architecture of the portable computing device 110 in accordance with the present invention. The portable computing device 110 includes a processor (or CPU) 170, a storage module 172, a memory 174, a communication interface 176, an expansion (or media) port interface 182, one or more other input/output (I/O) port interfaces 178, an optional graphics engine 180, and an audio processing engine 186. Each of the components of the portable computing device 110 may communicatively couple through a data bus 160.

The processor 170 is a conventional processor or controller such as an Intel(D XScale™ processor. The storage module 172 is a conventional long term storage device, for example, a hard drive (e.g., magnetic hard drive) or a flash memory drive. The memory 174 is a conventional computing memory such as a random access memory (RAM). The expansion (media) port interface 182 is configured to interface with an expansion (or media) card such as the ones previously described. The graphics engine 180 may include hardware, e.g., graphics chip, in addition to software to enhance graphics for display on the display screen 115.

The audio processing engine 186 is configured for audio related processing such as recording and playback, and includes appropriate hardware (e.g., microphone, speaker, and/or ports (or jacks) for such connections) and software (e.g., sound controls, channel control, and the like). The communication interface 176 is configured for network connections to a wide range of networks and includes appropriate hardware and software to communicatively couple to such networks. Examples of networks that can be configured to function with the handheld computing device 110 include personal area networks (e.g., Bluetooth), wireless networks (e.g., IEEE 802.11), and telecommunications networks (e.g., cellular or data). The one or more other I/O ports 178 include interfaces for connections such as universal serial bus (USB), IEEE 1394 (e.g., FireWire), and the like.

In addition, it is noted that the portable computing device 110 is configured to use conventional operating systems such as Palm OSL® from PalmSource™, Inc. or Windows CE or Windows Mobile from Microsoft® Corporation. It is noted that the device can also be configured for use with other operating systems, for example, Linux-based operating systems.

Figure 2:
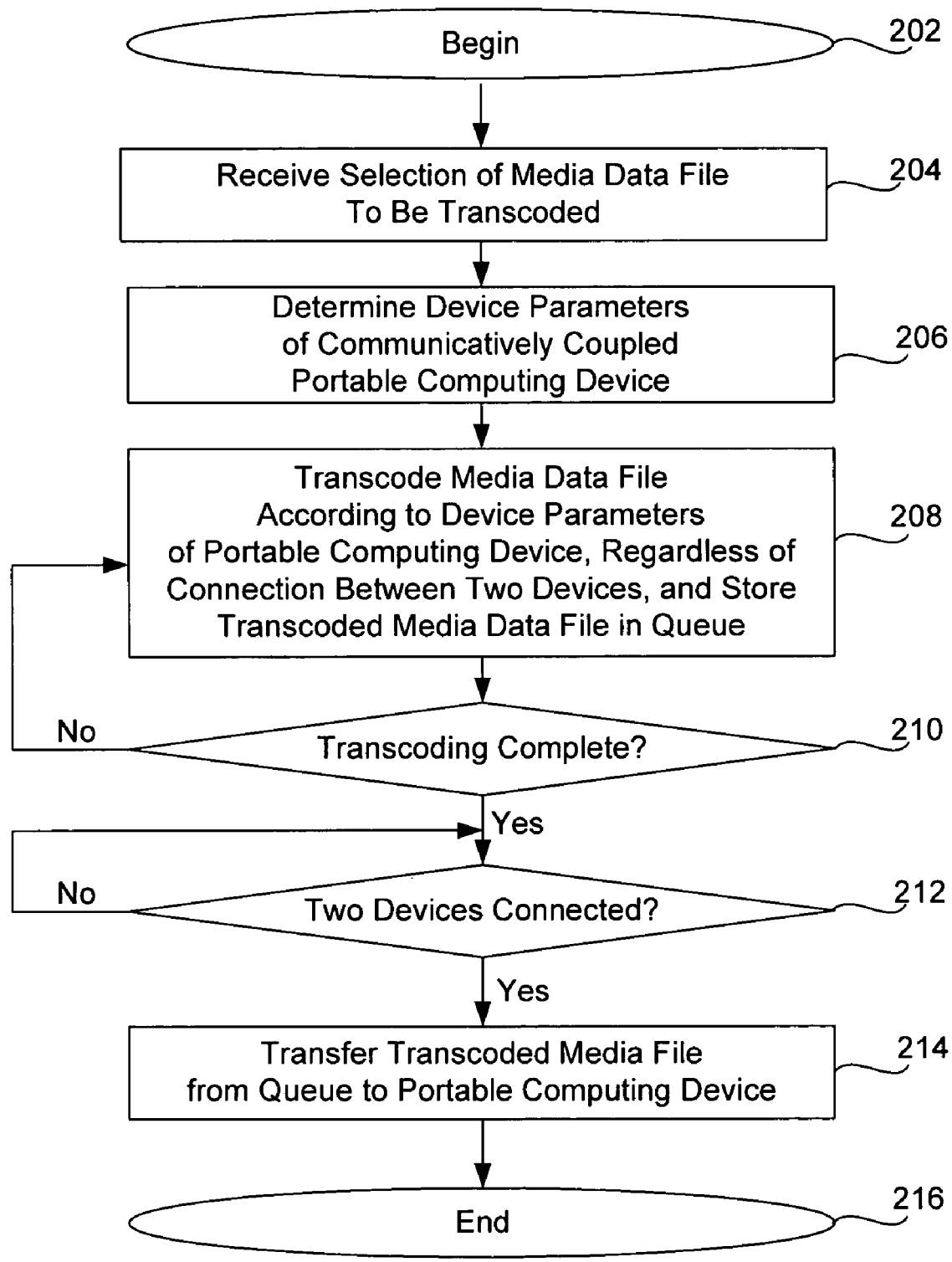
FIG. 2 is a flowchart illustrating one embodiment of a method of transcoding media files to be compatible with the device parameters of a portable computing device for transfer from a host computing device to the portable computing device, in accordance with the present invention.

FIG. 2 is a flowchart illustrating a method of transcoding media files to be compatible with the device parameters of a portable computing device 110 for transfer from a host computing device 100 to the portable computing device 110, according to one embodiment of the present invention. As the process begins 202, the data management software receives 202 a selection of a media file stored on the host computing device 100 to be transcoded and transferred to the storage module 172 of the portable computing device 110.

In order to perform the transcoding, the data management software determines 204 the device parameters of the portable computing device 110, such as the resolution or physical size (e.g., 2 inch diagonal screen) of the display 115, whether the display screen 115 can be rotated, the depth and number of colors displayable by the graphics engine 180, the type of graphics engine 180, the size of the memory 174 and/or the storage module 172, characteristics of the audio processing engine 186, speed of the processor 170, etc. In one embodiment, the device parameters of a plurality of different types of portable computing devices 110 are predetermined and pre-stored in the host computing device 100. In one embodiment, the host computing device 100 determines the type of the portable computing device 110, in response to the communicative connection of the portable computing device 110 to the host computing device 100, by obtaining a unique device identifier of the portable computing device 110 if the portable computing device 110 is communicatively connected to the host computing device 100. In another embodiment, the host computing device 100 may store a database of all types of supported portable computing devices 110, which is displayed to a user so that the user can select the particular portable computing device 110 that is being used with the host computing device 100. The data management software selects one of the sets of device parameters corresponding to the detected type of the portable computing device 110 to apply in the transcoding process.

Once the device parameters of the communicatively connected portable computing device 110 is determined, the data management software transcodes 208 the selected media file in accordance with such device parameters of the connected portable computing device 110, using known transcoding algorithms for various media file formats. The following table illustrates an example of the video file formats that can be transcoded by the data management software, in one embodiment of the present invention. Note that additional file formats not listed in the table can be supported for transcoding, using additional codecs (Encoder/Decoder). Also note that these file formats can be configured to be available as selection options for a user or can be automatically selected based on the device parameters of the portable computing device.

| Original File Format (Codec) | Original Resolution | Transcoded To: | New Resolution |
|---|---|---|---|
| MPEG-1 | ≦320 × 480 | MPEG-4 | 1:1 |
| MPEG-1 | >320 × 480 | MPEG-4 | Best Fit to 320 × 480 |
| MPEG-2 | ≦320 × 480 | MPEG-4 | 1:1 |
| MPEG-2 | >320 × 480 | MPEG-4 | Best Fit to 320 × 480 |
| MPEG-4 | ≦320 × 480 | MPEG-4 | 1:1 |
| MPEG-4 | >320 × 480 | MPEG-4 | Best Fit to 320 × 480 |
| ITU-T H.263 | ≦320 × 480 | MPEG-4 | 1:1 |
| ITU-T H.263 | >320 × 480 | MPEG-4 | Best Fit to 320 × 480 |
| Windows Media (e.g., .asf or .wma files) | ≦320 × 480 | MPEG-4 | 1:1 |
| Windows Media (e.g., .asf or .wma files) | >320 × 480 | MPEG-4 | Best Fit to 320 × 480 |
| DivX | ≦320 × 480 | MPEG-4 | 1:1 |
| DivX | >320 × 480 | MPEG-4 | Best Fit to 320 × 480 |

Note that the data management software performs the transcoding 208 of the media data file regardless of whether the portable computing device 110 is connected to the host computing device 100. Even if the portable computing device 110 is disconnected in the middle of the transcoding process, the transcoding still continues until the transcoding of the selected media files is completed. The transcoded file is temporarily stored in a copy queue (not shown) of the host computing device 100. This is beneficial, because the portable computing device 110 can be disconnected from the host computing device 100 once the transcoding is initiated without interrupting the transcoding process. For example, if the selected media for transcoding is a large video file, the transcoding process may take a long time (several minutes to hours). Even if the portable computing device 110 is disconnected from the host computing device 100 in the middle of the transcoding process, the transcoding process continues and the transcoded file is stored in the copy queue, so that the transcoded media data file can be transferred to the portable computing device 110 after the portable computing device 110 is reconnected to the host computing device 100.

The data management software determines 210 whether the transcoding process is complete. If the transcoding process is not complete, the transcoding 208 continues. If the transcoding process is complete, the data management software determines 212 whether the host computing device 100 and the same portable computing device 110, as identified by the same portable computing device identifier and the same user name, are communicatively coupled to each other. If the host computing device 100 and the same portable computing device 110 are communicatively coupled to each other, the data management software transfers 214 the transcoded media data file stored in the copy queue to the portable computing device 110, and the process ends 216. If the host computing device 100 and the same portable computing device 110 are not communicatively coupled to each other, the data management software waits until the same portable computing device 110, as identified by the same portable computing device identifier and the same user name, is communicatively reconnected to the host computing device 100, at which time the transcoded media data file is transferred 214 to the portable computing device.

It is noted that in one embodiment, the processes described herein in FIG. 2 are configured for operation as software or a computer program product. The software is stored as instructions in a computer readable medium such as a memory device 103 or a storage device 104 and is executable. The instructions (e.g., steps) of the process may also be configured as one or more modules that are configured to perform the function or functions described herein.

It is also noted that although the disclosure herein makes references in some embodiments to interaction between a personal computer and portable computing device, the principles disclosed herein are applicable to any configuration in which two computing devices are communicatively coupled. For example, in some embodiments there may be communications between a first computing device and a second computing device wherein the first device can be any computing type device (e.g., a server computer system, a personal computer, a desktop computer, a laptop computer, a personal digital assistant, a gaming device, a smart phone, etc.) or a portable computing system) and the second device can be any computing device (e.g., also a server computer system, a personal computer, a desktop computer, a laptop computer, a personal digital assistant, a gaming device, a smart phone, etc), of which one device may be a host and the other a client or the devices may be peers (e.g., peer to peer connection).

Upon reading this disclosure, those of ordinary skill in the art will appreciate still additional alternative structural and functional designs for a system and a process for transcoding media files for transferring from the host computing device to the portable computing device through the disclosed principles of the present invention. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A computer-implemented method of transcoding a media data file stored in a first computing device for transferring to a second, portable computing device, the method comprising:
   receiving a selection of a media data file to be transcoded;
   determining device parameters of the second computing device, responsive to the second computing device being in communication with the first computing device;
   transcoding the selected media data file in accordance with the determined device parameters of the second computing device, when the second computing device is in communication with the first computing device;
   continuing to transcode the selected media data file in accordance with the determined device parameters of the second computing device, even when the second computing device becomes communicatively disconnected from the first computing device in the middle of said transcoding and the second computing device is not in communication with the first computing device; and
   responsive to the second computing device being in communication with the first computing device, transferring the transcoded media data file from the first computing device to the second computing device.

2. The computer-implemented method of claim 1, wherein determining device parameters of the second computing device comprises:
   determining a type of the second computing device based on a device identifier of the second computing device received by the first computing device from the second computing device responsive to the second computing device being in communication with the first computing device; and
   selecting a set of predetermined device parameters corresponding to the determined type of the second computing device.

3. The computer-implemented method of claim 1, wherein the device parameters of the second computing device include display characteristics of the second computing device.

4. The computer-implemented method of claim 1, wherein the device parameters of the second computing device include audio characteristics of the second computing device.

5. The computer-implemented method of claim 1, wherein the device parameters of the second computing device include a processing speed of a processor of the second computing device.

6. The computer-implemented method of claim 1, wherein the device parameters of the second computing device include a size of storage available in the second computing device.

7. The computer-implemented method of claim 1, wherein transcoding the selected media data file comprises storing the transcoded media data file in a queue prior to transferring the transcoded media data file from the first computing device to the second computing device.

8. A computer readable medium storing a computer program product configured to cause a first computing device to perform a computer-implemented method of transcoding a media data file stored in the first computing device for transferring to a second, portable computing device, the method comprising:
   receiving a selection of a media data file to be transcoded;
   determining device parameters of the second computing device in communication with the first computing device;
   transcoding the selected media data file in accordance with the determined device parameters of the second computing device, when the second computing device is in communication with the first computing device;
   continuing to transcode the selected media data file in accordance with the determined device parameters of the second computing device, even when the second computing device becomes communicatively disconnected from the first computing device in the middle of said transcoding and the second computing device is not in communication with the first computing device; and
   responsive to the second computing device being in communication with the first computing device, transferring the transcoded media data file from the first computing device to the second computing device.

9. The computer readable medium of claim 8, wherein determining device parameters of the second computing device comprises:
   determining a type of the second computing device based on a device identifier of the second computing device received by the first computing device from the second computing device responsive to the second computing device being in communication with the first computing device; and
   selecting a set of predetermined device parameters corresponding to the determined type of the second computing device.

10. The computer readable medium of claim 8, wherein the device parameters of the second computing device include display characteristics of the second computing device.

11. The computer readable medium of claim 8, wherein the device parameters of the second computing device include audio characteristics of the second computing device.

12. The computer readable medium of claim 8, wherein the device parameters of the second computing device include a processing speed of a processor of the second computing device.

13. The computer readable medium of claim 8, wherein the device parameters of the second computing device include a size of storage available in the second computing device.

14. The computer readable medium of claim 8, wherein transcoding the selected media data file comprises storing the transcoded media data file in a queue prior to transferring the transcoded media data file from the first computing device to the second computing device.

15. A first computing device for transcoding a media data file for transferring to a second, portable computing device, the first computing device comprising:
   a storage module for storing a computer program product to cause the first computing device to perform a computer-implemented method of transcoding the media data file, the method comprising:
      receiving a selection of the media data file to be transcoded;
      determining device parameters of the second computing device in communication with the first computing device;
      transcoding the selected media data file in accordance with the determined device parameters of the second computing device, when the second computing device is in communication with the first computing device;
      continuing to transcode the selected media data file in accordance with the determined device parameters of the second computing device, even when the second computing device becomes communicatively disconnected from the first computing device in the middle of said transcoding and the second computing device is not in communication with the first computing device; and
      responsive to the second computing device being in communication with the first computing device, transferring the transcoded media data file from the first computing device to the second computing device; and
   a processor for executing the computer program product.

16. The first computing device of claim 15, wherein determining device parameters of the second computing device comprises:
   determining a type of the second computing device based on a device identifier of the second computing device received by the first computing device from the second computing device responsive to the second computing device being in communication with the first computing device; and
   selecting a set of predetermined device parameters corresponding to the determined type of the second computing device.

17. The first computing device of claim 15, wherein the device parameters of the second computing device include display characteristics of the second computing device.

18. The first computing device of claim 15, wherein the device parameters of the second computing device include audio characteristics of the second computing device.

19. The first computing device of claim 15, wherein the device parameters of the second computing device include a processing speed of a processor of the second computing device.

20. The first computing device of claim 15, wherein transcoding the selected media data file comprises storing the transcoded media data file in a queue prior to transferring the transcoded media data file from the first computing device to the second computing device.

* * * * *